United States Patent [19]
Hasegawa et al.

[11] 3,945,024
[45] Mar. 16, 1976

[54] CAMERA IN WHICH THE IRIS IS SET PRIOR TO THE EXPOSURE TIME AND ADAPTABLE TO PERMIT SHUTTER TIME PRESELECTION

[75] Inventors: Goro Hasegawa, Fuchu; Soichi Nakamoto, Machida; Yoshiaki Watanabe, Fujisawa; Tetsuya Taguchi, Kawasaki; Katuhiko Yamada, Yokohama, all of Japan

[73] Assignee: Canon Kabushiki Kaisha, Tokyo, Japan

[22] Filed: July 5, 1973

[21] Appl. No.: 376,676

[30] Foreign Application Priority Data
July 4, 1972 Japan.............................. 47-66893

[52] U.S. Cl. ..................... 354/29; 354/30; 354/31; 354/38; 354/43
[51] Int. Cl.² .............................................. G03B 7/00
[58] Field of Search......... 95/10 CE, 10 CD, 10 CT, 95/10 PO, 64 B, 64 D; 354/30, 38, 43, 60 R, 29, 31, 267

[56] References Cited
UNITED STATES PATENTS

| | | | |
|---|---|---|---|
| 3,527,149 | 9/1970 | Starp et al........................ | 354/60 EI |
| 3,664,245 | 5/1972 | Bresson et al..................... | 95/10 CD |
| 3,704,656 | 12/1972 | Ogiso et al........................ | 354/43 X |
| 3,710,699 | 1/1973 | Mitani .............................. | 95/10 CT |
| 3,721,167 | 3/1973 | Ogiso................................ | 95/10 CT |
| 3,733,984 | 5/1973 | Yata.................................. | 95/10 CT |
| 3,829,867 | 8/1974 | Ono................................... | 354/29 X |
| 3,896,472 | 7/1975 | Yoshiyama et al. ............... | 354/38 |

*Primary Examiner*—L. T. Hix
*Assistant Examiner*—James LaBarre
*Attorney, Agent, or Firm*—Toren, McGeady and Stanger

[57] ABSTRACT

A camera in which the iris is set prior to the exposure time, particularly a camera which can be converted into a camera in which the exposure time is set prior to the iris adjustment by mounting an additional iris control device on the view finder.

6 Claims, 6 Drawing Figures

CAMERA IN WHICH THE IRIS IS SET PRIOR TO THE EXPOSURE TIME AND ADAPTABLE TO PERMIT SHUTTER TIME PRESELECTION

A camera in which the iris is set prior to the exposure time in such a manner that the iris is set in advance while the exposure time is automatically controlled to obtain a proper exposure has already been known.

Because in the case of the camera in which the iris is set in advance, the photographer has the liberty to choose the value of iris at his option, and it is possible for him to choose the depth of the object freely. Consequently when he takes a photograph of an object standing still for which the depth of the object plays an important part of the picture, a desirable picture can be obtained. However, the exposure time in this case is automatically decided so that there exists a possibility that a longer exposure time should be given for an object in quick motion, whereby it is possible to obtain a good picture. Namely, it can be said that this kind of camera is not suitable for an object in quick motion. On the other hand, a camera in which the exposure time is set in advance avoiding the above-mentioned weak point of the camera in which the iris is set in advance has already been known. Quite contrary to the camera in which the iris is set in advance, in the case of the above-mentioned camera the exposure time is set in advance and the iris is controlled in accordance with the exposure time to obtain a proper exposure, whereby there exists a weak point even in such a camera. Namely, while the exposure time can be chosen freely in accordance with the speed of an object in motion so that a good picture without shearing can be obtained, avoiding a weak point of a camera in which the iris is set in advance, the merit of the camera in which the iris is set in advance, i.e. the possibility to choose the depth of an object freely, cannot be brought out because the iris is automatically set, leaving no space for the photographer his option for selection. Such being the situation, the apparition of such a camera as covers the weak points of both kinds of cameras has long been waited for, whereby the iris can be set in advance while in case of necessity the exposure time can be set in advance.

One of the objects of the present invention is to offer a camera in which the iris can be set in advance while in case of necessity the exposure time can be set in advance.

Another object of the present invention is to offer a camera in which the iris can be set in advance while in case of necessity the exposure time can be set in advance by mounting additionally an iris control device on the view finder of the camera.

Other objects of the present invention will become clear from the below descriptions concerning the embodiments of the present invention.

BRIEF EXPLANATIONS OF THE DRAWINGS

Below the camera according to te present invention in which the iris is set in advance is explained in detail.

Figure 1:
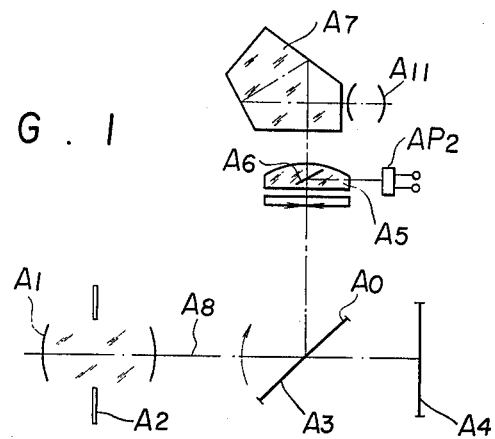
FIG. 1 shows the important part of a conventional camera in which the iris is set in advance.
Figure 2:
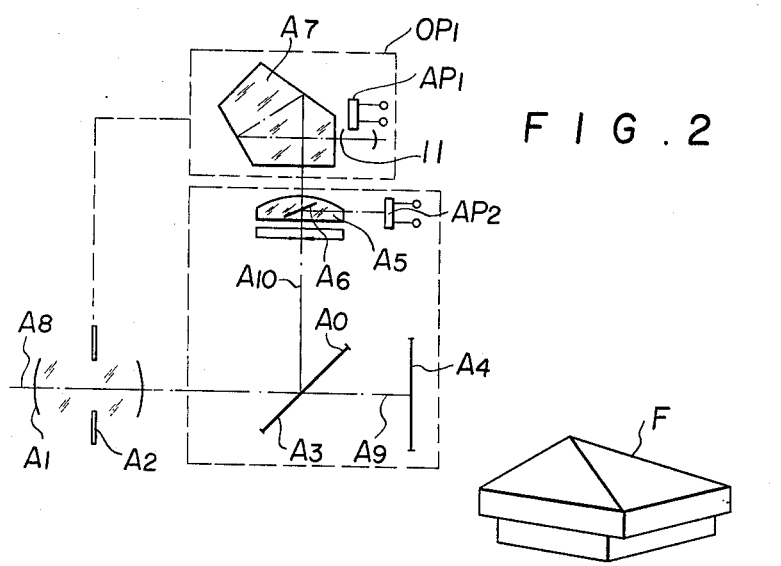
FIG. 2 shows an important part of the camera according to the present invention in which the iris is set in advance, whereby the iris control device has been mounted.

FIG. 1 shows an important part of the conventional camera in which the iris is set in advance. In the drawing A1 is the photographing optics, A3 the reflex-mirror, A4 a film, A5 the condenser lens, A6 the beam splitter, A7 the pentaprism, A8 the light beam coming from the object, A11 the light beam entering the distance measuring view finder, AP2 the light beam receiving element in the circuit of the electric shutter (not shown). Below the function of the camera will be explained. By rotating the iris ring (not shown in the drawing) provided on the photographing optics A1, the information of the iris value is given to the circuit of the electric shutter in advance. Then the shutter release button (not shown in the drawing) being pushed down, the reflex mirror 43 springs up around the axis Ao as support point, while the shutter is opened in such a manner that the light beam A8 coming from the object reaches the film A4. On the other hand, before the shutter release button being pushed down, the light beam A8 coming from the object enters the light beam receiving element AP2 through the reflex mirror A3 and the beam splitter A6, whereby the light quantity of the beam coming from the object is received by the light beam receiving element AP2 and memorized in the circuit of the electric shutter. After a certain time determined by the memorized quantity and and iris value the magnet in the circuit of the electric shutter operates, the shutter is operated and the exposure is finished. This is what is called the camera in which the iris is set in advance. With this camera in which the iris is set in advance, the photographer can select the iris value at his option, while it is impossible to choose the exposure time freely. It is the principal object of the present invention to solve the disadvantage. This object can be achieved by interchanging the view finder of the camera as shown in FIG. 2. FIG. 2 shows the construction with which it is possible to convert the camera according to the present invention in which the iris is set in advance into the one in which the exposure time can be set in advance. The explanation for the parts bearing the same figures as in FIG. 1 is hereby omitted. In the drawing A2 show the iris blade controlled by the iris control device OP1, the detail of which will be explained later, A9 the light beam coming from the object and reaching the film, A10 the light beam coming from the object, deflected by the reflex mirror A3 and reaching the iris control device OP1, and AP1 the iris control device to be mounted on the upper part of the camera body, comprising a shutter dial (not shown in the drawing) and the element AP1 receiving the light beam, whereby the output terminals of AP1 are connected to the iris control circuit (not shown in the drawing). Further, in the above-mentioned iris control circuit a variable resistance mechanically connected with shutter dial and giving the information of the exposure time to the iris control circuit is inserted. Hereby the iris control device is so constructed as to let the iris blade A2 work properly in accordance with the exposure time set by the shutter dial and the light quantity received by the light receiving element AP1.

In order to convert the camera in which the iris is set in advance into the camera in which the exposure time is set in advance, at first the iris control device OP1 is mounted on the camera as shown in FIG. 2, whereby the iris blade A2 and the output terminals of the iris control device are mechanically connected. Then by means of the shutter dial (not shown in the drawing) of the iris control device OP1, the exposure time is set at an optional value. When the shutter release button (not shown in the drawing) is pushed down, the iris blade closes to the proper iris value by means of the iris control device OP1 in accordance with the exposure time set in advance and the light quantity of the light receiving element AP1. To the light receiving element in the circuit of the electric shutter (not shown in the drawing), the light beam coming from the object A10 through the iris blade is given. This light quantity is memorized in a memory means such as condenser in the circuit of the electric shutter (not shown in the drawing). When the shutter release button (not shown in the drawing) is further pushed down, the reflex mirror springs up while the shutter is at the same time opened. After a certain time determined by the light quantity memorized in the circuit of the electric circuit, the magnet in the circuit of the electric shutter is operated, the shutter is closed and the exposure is finished. Thus, according to the present invention, the camera body is the one in which the iris is set in advance, while by mounting the iris control device on the upper part of the camera it can be converted into the one in which the exposure time is set in advance.

Figure 3:
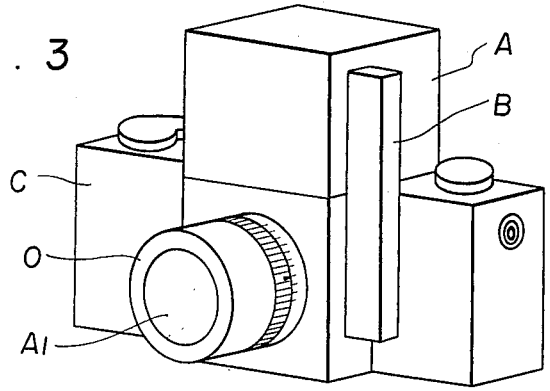
FIG. 3 shows a perspective view of an embodiment of the camera in which the iris is set in advance, whereby the iris control device has been mounted.

Below the present invention will be explained referring to the FIG. 3 to 6. FIG. 3 shows a perspective view of an embodiment of the camera in which iris is set in advance, whereby the iris control device has been mounted. In FIG. 3, A is the iris control device, O the optics, whereby by means of the connecting means B the iris control device and the camera body C are connected with each other. Hereby F is the view finder, whereby, according to the invention, the camera, being equipped with the view finder is the one in which iris is set in advance, while the camera being equipped with the iris control device is the one in which the exposure time is set in advance.

Figure 4:
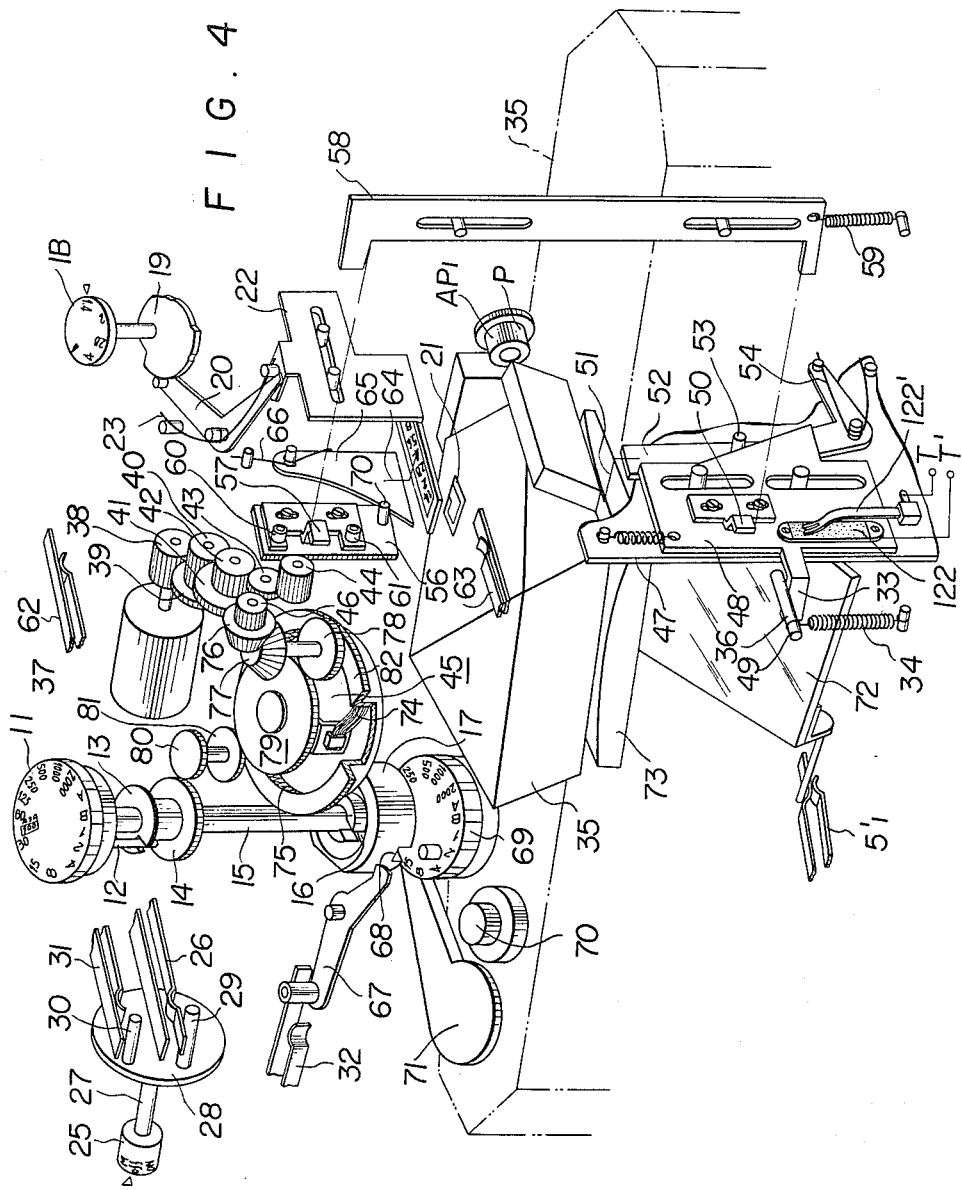
FIG. 4 shows as a whole the iris control device mounted on the camera according to the present invention.

FIG. 4 shows as a whole the iris control device shown in FIG. 3 and mounted on the camera according to the present invention. In FIG. 4, 11 is the shutter dial for the attachment for setting the exposure time and the sensitivity of the film, whereby through the engagement of a pin with the shutter dial and the notched plate, the rotation of the shutter dial 11 is transferred to the gear 14 integrated with the notched plate. 15 is a shaft integrated with the shutter dial 11, whereby it is so designed that the joint 17 whose rotation is restricted by the pin making a body with the shaft 15, and the shutter dial 69 of the camera body engages with each other.

18 is the set dial for the lens fully opened to determine the iris value of the optics mounted on the camera, whereby by turning the dial 18 the holder 22 of the iris scale 21 is moved by means of the lever 20 in engagement with the cam 19 making a body with the dial 18 in such a manner that the calibration due to the interchange of the lens is given to the iris control device A. 23 is a spring serving to press the lever 20 and the holder 22 always against the cam 19. The example shown in the drawing is the case in which the iris value is set on 1.4.

25 is a nob serving to close and open the main switch 26 of the iris control device A, whereby at the other end of the shaft 27 making a body with the nob 25 a disc 28 is mounted, on which the switch-over pin 29 and 30 are fixed. For manual operation, the setting is made on M, whereby the switch 31 for the manual operation remains closed, while the switch 26 is opened so that the manual operation can be carried out due to the reason mentioned below. Further, when the nob 25 is placed on the position "on", the pin 30 opens the switch 31 while the pin 29 closes the switch 26, so that the function of electric eye can be carried out so far as the switch 32 remains opened.

49 is a means mechanically connected with the preset ring of the automatic iris mechanism of the optics O, whereby in the drawing it is drawn in a direction toward the optics by a spring 34. It is natural that the optics makes a body with the camera body so far as it is not interchangeable. Even if it is interchangeable, it is possible to provide a member corresponding to the pin 36 on the camera in such a manner that the member is mechanically connected with the interchangeable lenses.

37 is a driving motor for servo-controlling of the iris control device A, whereby the rotation of the motor 37 is conveyed to the gear 44 for controlling the preset position of the iris by means of a series of gears 39, 40, 41, 42, 43 mechanically connected to the gear 38 mounted on the same shaft of the motor 37 and at the same time to the gear 46 for adjusting the resistance 45 serving to adjust the variable resistance 45 for the light measuring with opened iris blade corresponding to the preset iris value of the optics.

It is sufficient that the preset pin is mechanically connected with the motor 37 in the same way, in the example shown in the drawing the pin provided in the mirror box 47 of the camera body touches the upper end of the bowed part making a body with the middle plate 48 restricted in motion while the lower end 50 of the abutment making a body with the middle plate 48 is mechanically connected with the motor in order that the camera can be operated as the one in which the iris is set in advance even when the view finder is put aside. The middle plate 48 is intended to make the finger 51 corresponding to the preset iris value visible in the field of the view finder even when the camera body 35 and the view finder F are connected with each other, whereby 52, 53 and 54 are the connecting means.

Therefore, the spring 34 serves to give a stronger force than the spring 55, whose one end is fixed on the camera body.

Below the engagement between the motor 37 and the lower end of the abutment 50 on the middle plate 48 is explained.

The upper end of the abutment 57 making one body with the preset position control plate moved in engagement with the gear 44 and the lower end of the abutment 50 of the middle plate 48 on the camera side are connected with the arm 58 moved to and fro. The arm 58 is pulled downward by a very weak spring 59.

The example shown in the drawing is the device constructed as the iris control device A whereby the number of switches are kept as small as possible, so that the abutment 50 on the camera side when not restricted is always pulled downward by a strong spring in order to avoid any misengagement of the abutment of the arm 58 with the abutment 57 of the iris control device A and the abutment 50 on the camera side when the iris control device A is mounted on the camera body C in such a manner that the iris control device A and the camera body C are connected with each other by means of the arm 58 so that it is necessary to move the abutment 57 on the iris control device A by setting the nob 25 on the position M, even in which case it is possible to make it unnecessary to set the nob 25 on the position M by increasing the number of switches in such a manner that the mounting and dismounting of the arm 58 of the device A is engaged with switches.

The pins 60 and 61 fixed on the control plate serves to operate 62 and 63 at the upper and lower extremity respectively. The pin on the control plate 56 is always in touch with the cam plate 65 having a finger 64 indicating the iris scale by means of the spring 66, whereby the iris value is indicated by means of the upward and downward motion of the control plate 66 due to the motion of the servo motor 37.

It is so designed that when the shutter dial 11 is set on (B), in the notch 68 of the joint 17 the one end of the lever falls down in such a manner that the switch for (B) is closed. Hereby 35 is the penta prism, 70 the shutter release button, 71 the lever to wind up the film. 122 is a resistance provided on the camera body and being connected to the circuit of the electric shutter, to which resistance the rotation of the motor, namely the information of the iris value is conveyed by means of the arm 58. 122' is the slider of the resistance 122, while T, T' are the terminals of the resistance.

Figure 5:
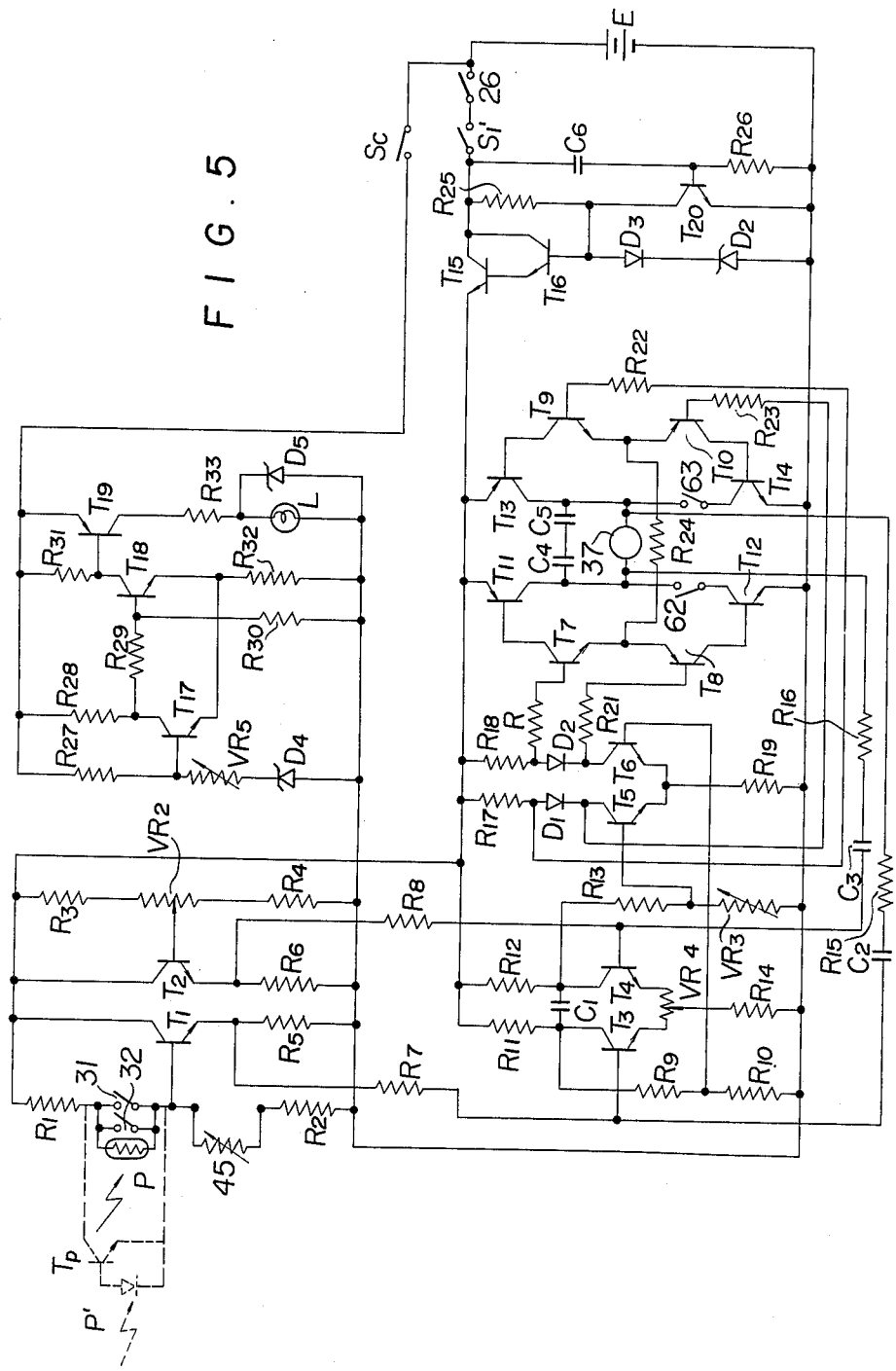
FIG. 5 shows a circuit diagram of the iris control device shown in FIG. 4.

FIG. 5 shows a circuit diagram of the iris control device shown in FIG. 4. In the drawing P is a CdS element as a photoelectric transducing element and can be substituted with the network consisting of a photoelectric element P' and a transistor $T_p$ as shown in the dotted line. $R_1$, $R_2$, $R_3$ and $R_4$ are the fixed resistances, whose values are adjusted and maintained by a motor 37 driven according to the output of a resistance bridge network. $VR_2$ is a circuit adjusting resistance. 32 and 31 are the switches to be closed respectively for (B) photographing and for manual adjustment. $T_1$ and $T_2$ are respectively the transistors connected to the output terminals of the resistance bridge circuit, to the emitters of which transistors the output resistance $R_5$, $R_6$ are connected. $R_7$ and $R_8$ are respectively the middle resistances. The output of the resistance bridge circuit is led into the input of the differential amplifier having transistors $T_3$ and $T_4$ through transistors $T_1$, $T_2$ and resistances $R_5$, $R_6$, $R_7$ and $R_8$. To the output network of the differential amplifier the resistances $R_9$, $R_{10}$, $R_{11}$, $R_{12}$ and $R_{13}$ and the circuit adjusting resistance $VR_3$ are connected, while the adjusting resistance $VR_4$ to compensate the characteristics of the transistors, the resistance $R_{14}$ for the current source and the so-called capacitor $C_1$ to check the parasitic oscillation are connected as shown in the drawing. The output of the differential amplifier is led into the input of the inversed differential amplifier having transistors $T_5$, $T_6$. To the output network of the inversed differential amplifier, beside the output resistance $R_{17}$, $R_{18}$ the diodes $D_1$, $D_2$, the resistances $R_{20}$, $R_{21}$, $R_{22}$ and $R_{23}$ together with the resistance $R_{19}$ for the current source are connected as shown in the drawing. The diodes $D_1$ and $D_2$ serve to compensate the operating voltage between the base and the emitter of the transistor to be explained below and being connected in bridge connection in the output circuit of the differential amplifier.

Then to the input circuit of the transistors $T_{11}$, $T_{12}$, $T_{13}$ and $T_{14}$ in bridge connection the output circuit of the transistors $T_7$, $T_8$, $T_9$ and $T_{10}$ controlled by means of the resistances $R_{20}$, $R_{21}$, $R_{22}$ and $R_{23}$ connected to the output circuit of the differential amplifier is connected in such a manner that the motor 37 connected to the transistors $T_{11}$, $T_{12}$, $T_{13}$ and $T_{14}$ in accordance with the fluctuation of the input. Hereby $R_{24}$ is a resistance giving a braking effect and is connected as shown in the drawing. Further, the capacitor $C_4$, $C_5$ having polarity are connected so as to compose a capacitor having no polarity and serve to electric noises. The switches 62, 63 inserted in the output circuit of the transistors $T_{11}$, $T_{12}$, $T_{13}$ and $T_{14}$ in bridge connection serve to control the current supply to the motor in accordance with the over- and under-exposure, whereby it is so designed that they opens when the device cannot be controlled within the range possible for the light measurement. Therefore, it is possible to carry out a proper photographing in resetting the exposure time so as to bring the device within the range possible for the light measurement, by making use of the alarming means provided in the view finder.

Further, as the alarming means, the lamp alarming as well as a sound alarming can be applied. Hereby the switches 62 and 63 as shown in the drawing are in general quite effective in case the driving of the load of the output circuit of the transistors in bridge connection is controlled by the control input such as the output of the comparison circuit. For example, it is possible to compose a very simple driving control of the motor including the switch of lens zooming button as the control input in case the motor is utilized as zooming motor whereby 62 and 63 are used as the limit switches at the wide lens end and the telescopic lens end, whereby further by means of the motors driven by the input means such as the zooming switch 62 and 63 which are opened can be closed. Thus, it is considerably profitable in case of the servo control.

Below the circuit of the embodiment will be explained. Because the motor 37 is apt to cause the so-called hunting phenomenon in case the intensity of the light as input changes abruptly, it is necessary to give a proper braking effect taking the response characteristic in full consideration, to which purpose the resistances and the capacitors $R_{15}$, $C_2$ and $R_{16}$, $C_3$ connected to the terminals of the motor serve, whereby they are connected to the input circuits of the differential circuit having transistors $T_3$, $T_4$. Hereby the capacitors $C_2$, $C_3$ serve to cut the D.C. component allowing the high frequency component only to pass as filter so as to suppress the fluctuation of the speed of motor. Namely, $C_2$, $R_{13}$: $C_3$, $R_{15}$ give out a braking effect by tripple negative feed back.

Below the current source is explained. $T_{15}$ and $T_{16}$ are the transistor in Darlington connection, whereby the output circuit of the network is connected in series with the current source as well as the above-mentioned load circuit group, while it is so connected as to be controlled by the constant voltage set by the bleeder resistance connected in parallel with the battery. The bleeder resistance consists of the resistance $R_{23}$, diode $D_3$ and the Zener diode $D_z$. Hereby the diode $D_3$ is connected in forward direction, with which connection the misconnection with the battery with inversed polarity is prevented. In case the Zener voltage is 6V, the $D_3$ whose saturation voltage in forward direction is about 0.5V is used.

Both 26 and $S_1'$ are the switch of the current source, whereby 26 is the main switch while $S_1'$ is the one which is opened when the mirror is turned up (or the iris blade is closed by the iris lever). (As to this switch the synchronization switch in the camera body can be utilized, being inversed.) Especially the switch $S_1'$ is important for memorizing the iris value in order to avoid the change of the iris value servo-controlled by the automatic control circuit by the input fluctuation due to the turning up of the mirror.

Because in practice the device as a whole operates in undesirable way in case the photoelectric element such as CdS element whose transient response characteristics from the darkness to the brightness is inferior is used when the current source is connected with the load circuit immediately after the turning down of the mirror although the switch $S_1'$ is opened and the servo-device keeps the memory, as the counter measure it is desirable to design in such a manner that the source voltage is put on the load circuit only after lapse of the time corresponding to or longer than the transient response characteristics of the photoelectric transducing element. It has been proved that the misoperation due to the transient response characteristic of CdS element can be avoided, by connecting the resistance $R_{25}$, the transistor $T_{20}$, the capacitor $C_6$ and the resistance $R_6$ as delay circuit as shown in the drawing. Further, as the photoelectric transducing element, the network as shown in the dotted line can be used, whereby the delay circuit can be omitted.

Below the checker circuit for the current source is explained. E is a battery, whereby in the present embodiment the above-mentioned stabilizing circuit of the current source is so designed that the device operates stabilized with 7–12V so that in such case the current in the checker circuit changes. Therefore, it can be allowed that the influence of such changes is indicated in the scale of an ampere meter or in the brightness of a lamp, whereby the range of utilization cannot be indicated well.

In the present embodiment it is so designed as to indicate the range of the utilization by the lamp in this case so that the life of the lamp can be prolonged while the brightness of the lamp can be kept almost constant. In the drawing $R_{27}$, $R_{28}$, $R_{29}$, $R_{30}$, $R_{31}$, $R_{32}$ and $R_{33}$ are the resistances, $VR_5$ the adjusting resistance, $T_{17}$ and $T_{18}$ the transistors composing a Schmidt-circuit, whereby $T_{18}$ is the transistor connected with the output circuit of the Schmidt circuit, $D_4$ the Zener diode as voltage stabilizing element, $D_5$ the Zener diode as voltage stabilizing element serving to absorb the current fluctuation due to the voltage fluctuation of the battery and L the lamp which lights up with almost a constant brightness in case the voltage of the battery as current source lies almost above the range of the utilization range. Sc is the check switch to close and open the checker circuit.

Figure 6:
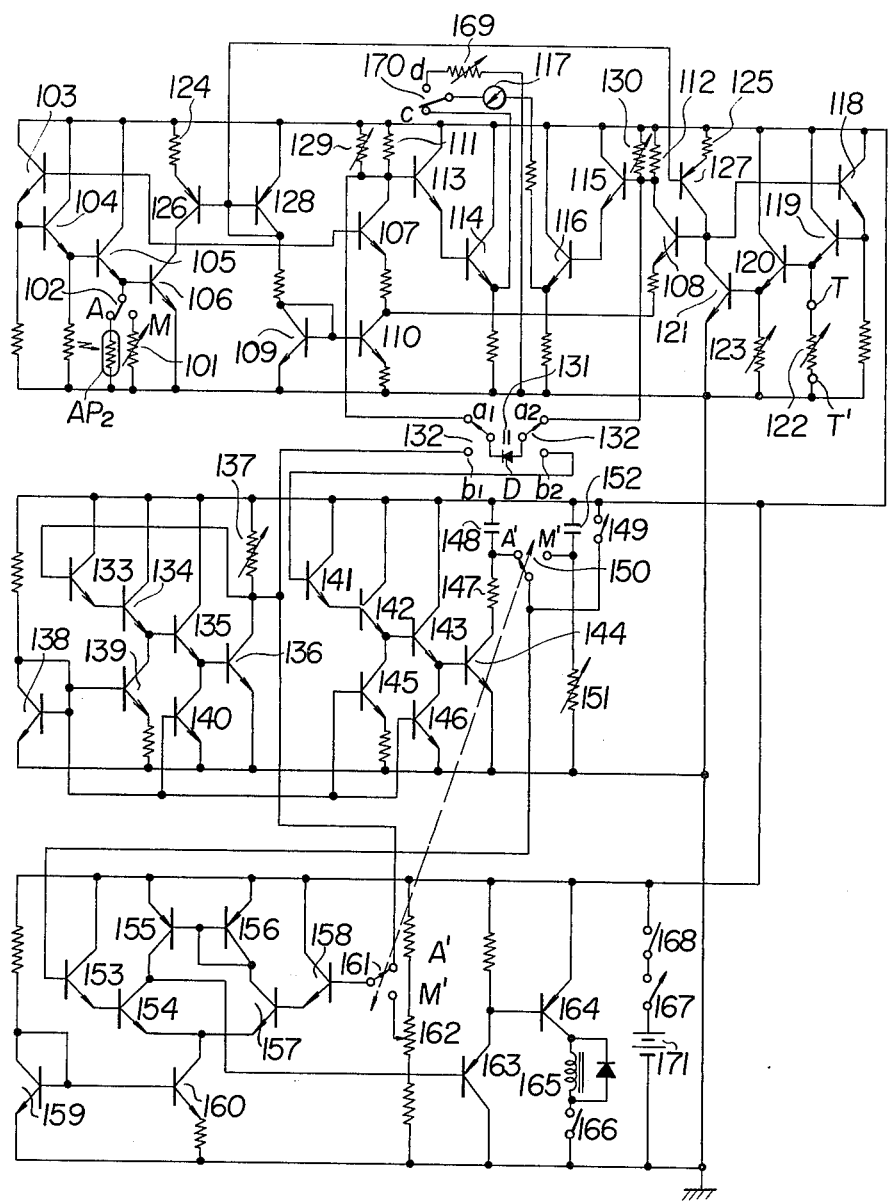
FIG. 6 shows a circuit diagram of the electric shutter of the camera shown in FIG. 3 according to the present invention in which the iris is set in advance.

Below the explanation is made according to FIG. 6. FIG. 6 shows a circuit diagram of the electric shutter of the camera shown in FIG. 3 as C according to the present invention. It is an electric shutter having transistors, comprising the memory circuit with condensers and the indicating circuit of shutter speed, whereby the circuit is so designed as to be easily integrated. In FIG. 6, AP2 is the photoconductive element according to FIG. 1 and receives the light beam coming from the object through the optics. 101 is the variable resistance mechanically connected with the exposure adjusting dial 69 or the manual adjusting. 102 is the switch to convert the camera in which the iris is set in advance into the one in which the exposure time is set manually in advance, whereby when the index A on the dial 69 is set on the fixed index on the camera body the connection is made with A side, while otherwise the connection is made with M contact. 103 to 106 are transistors composing the amplifier circuit in direct connection, 107 and 108 the transistors composing the differential amplifier circuit, 109 and 110 the transistors composing the current stabilizing circuit for the differential amplifier and 111 and 112 the load resistances. Further, the transistors 113, 114, 115, and 116 compose the indication circuit of the shutter speed, whereby the output of the circuit drives the ampere meter 117. Further, in the amplifier circuit consisting of the transistor 118 to 121, the variable resistances 122 and 123 are inserted, whereby the photographing information such as the iris value, the sensitivity of the film and so on are set with them. Further, in the collector circuits of the output transistors 106 and 121 of the photoelectric member circuit and the information setting circuit transistors 126 and 127 are connected in series with the load resistances 124 and 125, whereby the bases of the transistors 124 and 125 are connected to the diode connected transistor 128. Further to the load resistances 111 and 112 of the memory circuit the variable resistances 129 and 130 are respectively connected in parallel, whereby it is so designed as to compensate the characteristics of the circuits and the gamma of the variable resistances for the photoconductive element and for the information setting. Further, by applying this kind of the circuit the output change of the directly connected circuit having a feed back route can be reduced down to 18mV a 1EV.

131 is the memory condenser, whereby connected with the shutter operation by means of the switching-over switch 132 the memory condenser is switched from the memory circuit $a_1$, $a_2$ over to the reproduction circuit $b_1$, $b_2$. 133 to 136 are the transistors composing the bias control circuit of the reproduction circuit, 137 the adjusting resistance, 138, 139 and 140 the voltage stabilizing transistors for the control circuit, 141 to 144 the amplifier circuit in direct connection composing a reproduction circuit and 145 and 146 the transistors for the voltage stabilizing circuit. The output of this circuit is connected to the condenser 148 for example, through the resistance 147. 149 is the switch which is opened with the function of the shutter, 150 the switch with which the automatic adjustment is switched over to the manual operation, 151 the variable resistance mechanically connected with the shutter dial for manual setting of the shutter speed and 152 the condensers. 153 to 158 are the transistors of the differential amplifier composing the first step of the control circuit of the shutter speed and the 159 and 160 are the transistors of the voltage stabilizing circuit. 161 is the switcing over switch mechanically connected with the switch 150. 162 is the variable resistance of the voltage dividing circuit and serves to adjust the standard voltage in case of the manual operation, 163 and 164 the transistors of the switching circuit composing the latter step of the control circuit of the shutter speed and 165 the magnet to operate the shutter closing member. 166, 167 and 168 are the switches, 169 the adjusting variable resistance of the voltage checking circuit, 170 the switching-over switch and 171 the current source.

Below the operation of the above-mentioned device is explained.

The view finder F connected with the camera body is dismounted and the iris control device according to the present invention is mounted in its stead. Hereby the pin of the shutter dial 69 of the camera body engages in the groove of the joint. Consequently, when the dial 11 is rotated the dial 69 is rotated by means of the shaft 15, pin 16 and joint 17 in such a manner that the shutter speed can be freely set.

Further, the abutment 57 on the control plate 56 of the iris control device A and the abutment 50 on the middle plate 48 of the camera body are connected by the arm with each other. Thus the movement of the servo-motor 37 is conveyed to the control plate 56 and to the preset signal pin 36 through the arm 58, the abutment 50 and the middle plate 48 and its bowed upper end 33.

When the shutter dial 11 is set and the switch 25 is closed, the switch 26 is closed and the switch 31 opened by means of the shaft 27, the disc 28 and the switching pins 29 and 30 in such a manner that the electric eye mechanism is ready to operate. When the camera is directed to the object in this state, the light beam through the lens O reaches the photoelectric transducing elements P arranged on both sides of the eye piece of the view finder through the reflexing mirror 72, the condenser 73 and the pentagonal roof prism 35. If now the resistance value of the photoelectric transducing element P and the resistance value of the variable resistance set in advance, namely, the resistance value at the contact position of the brush 74 with the variable resistance 75, are different from each other, a current flows in the bridge circuit and amplified by the differential amplifier in such a manner that the servo-motor is rotated, which movement is conveyed to the brush 74 through the gears 38, 39, 40, 41, 42, 43, 46, 76, 77, 78 and 79 until the resistance value of the bridge circuit becomes equal to the resistance value of the photoelectric transducing element P, whereby the motor 37 stops. At the same time the movement of the servomotor is conveyed to the iris preset signal pin 36 through the gears 43, 44, the control plate 56, the abutment 57, the arm 58, the abutment 50, the middle plate 48 and its bowed upper end 33 in such a manner the iris value is set in advance. Further, due to the movement of the bowed part 33 the iris value is set on the variable resistance 122 of the electric shutter circuit. Further, the movement of the control plate 56 is conveyed to the finger 64 through the pin 57 and the cam plate 65 in such a manner that the set iris value is indicated on the scale 21.

Further when the shutter dial 11 is rotated, the gear 82 is also rotated through the pin 12, the notch plate 13 and the gear 14, 80 and 81, whereby the contact position of the variable resistance 75 provided inside the gear 82 with the brush 74, i.e. the resistance value changes in such a manner the servomotor 37 moves until a balance is obtained.

In the drawing the control plate 56 moves upwards when the object is dark in such a manner that the iris of the lens is opened, while it moves downward when the object is bright in such a manner that the iris of the lens is closed. Hereby the control plate 56 stops at the upper and the lower limit position until the switches 62 and 63 are opened and the signal in reversed direction comes in.

In this way the iris value is given to the electric shutter circuit through the variable resistance 122. Then the switches 167 and 168 in the electric circuit are opened while the switching-over switch of the battery checking circuit is kept in contact with C side. Hereby in order to keep the consumption of the battery by the magnet 165 as small as possible, it is so designed that the switch 166 is closed immediately before the operation of the shutter and opened with the closing operation of the shutter. When in connection with the setting of a certain determined exposure time the dial 69 on the camera, whose switching-over switch 102 is mechanically connected with the dial 11 is set on "M" (manual), the variable resistance 101 is connected with the circuit and the resistance set by the variable resistance 101 resumes a certain determined value whereby in the output circuit of the transistor 106 of the amplifier circuit in direct connection an output corresponding to the set resistance value is produced. There is provided a feed back route between the collector of the transistor 106 and the base of the transistor 103 in the above-mentioned amplifier circuit, the variation of the resistance value corresponding to the resistance value set on the variable resistance appears at the output in the reduced form. Further, there are provided the variable resistances 122 and 123 in the circuit of the transistors 118 to 121 composing an amplifier circuit similar to the above-mentioned circuit, in which resistances the film sensibility decided by the iris control device is set. Hereby the film sensibility is set manually. Further, there is also a feed back route provided between the collector of the transistor 121 and the base of the transistor 118 in the above-mentioned amplifier circuit, the variation of the film sensibility the iris value set by the variable resistances are to appear at the output of the amplifier circuit in a reduced form. The outputs out of these two circuits produce voltages on the negative resistances 111, 112, 129 and 130 being consisting of the transistors composing the differential amplifier circuit and being connected to their collectors and are memorized in the memory condenser 131 when the switching-over switch 132 is connected to the $a_1, a_2$ side (memory side).

Further, to compensate the characteristics of the above-mentioned two circuits and the gamma of the photoconductive elements and the variable resistances for setting informations the variable resistances 129 and 130 are connected in parallel to the negative resistances 111 and 112 in such a manner that by adjusting the variable resistances the characteristics of both circuits are made to match with each other. Further, in the above two circuits the indicating circuit for the shutter speed consisting of the transistor 113, 114 and 115, 116 in such a manner that the shutter speed can be known in advance by means of the indication of the ampere meter 117.

Then the dial 11 is changed over to the auto side, and in association with the push-down of the release button the switching-over switch 132 is switched from $a_1, a_2$ over to $b_1, b_2$. By doing this, the voltage of the capacitor 131 memorized before the operation of the shutter is given to the reproduction circuit. Further, the one terminal of this condenser is connected to the amplifier circuit in direct connection having a feed back route consisting of the transistors 133 to 136 so that on the output of this circuit a voltage with reducing characteristics appears. By means of this control voltage the gain of the reproduction circuit is so controlled as to give out an enlarging effect. Hereby these circuits are provided with voltage stabilizing circuit. Thus, the memory voltage given to the base of the transistor 141 of the reproduction circuit is enlarged and given to the power transistor 144 whereby its output resistance value is changed. The variation of this output resistance value comes to correspond to the variation of the resistance value set by the variable resistance 101, the reducing effect of the memory circuit been killed by the enlarging effect of the reproduction circuit. The control circuit of the shutter speed is operated with the time constant decided by the above-mentioned output resistance value and the condenser in the time constant circuit deciding the shutter speed, whereby a proper exposure is obtained. When the switch 147 is opened in connection with the operation of the shutter the condenser 148 is charged according to the output resistance value of the above-mentioned reproduction circuit, whereby the terminal voltage is given to the base of the one transistor 153 of the differential amplifier circuit. On the other hand, to the base of the transistor 158 the stabilized voltage is given from the transistor 136 of the amplifier circuit in direct connection, whereby the difference voltage is taken out as the output from the transistor. Hereby it is possible to nulify the influence coming from the deviation of the capacity 148 by means of the adjusting resistance 137. With above-mentioned difference voltage the switching circuit consisting of the transistors 163 and 164 is operated whereby after the delay time decided by the time constant of the time constant circuit the transistor 164 becomes inconductive in such a manner that the shutter closing member held by the magnet 165 is resolved and the shutter is closed. Consequently, the iris value of the lens is automatically set with the exposure time set in advance with the dial 11 on the camera body C, so that the camera in which the exposure time is set in advance.

Further, when the switching-over switch 102 is connected to A auto, the photoconductive element AP2 is connected to the circuit and the exposure time assumes the value corresponding to the resistance value due to the light coming from the object. Namely the diaphragm and the shutter time are automatically determined by the light of the object. Meanwhile, if the dial 11 is not changed over to auto, but retained as manual at the time of releasing, photographing can be made by the shutter time preset by the time constant circuit composed of the condenser 152 and the resistor 151 after the diaphragm is automatically adjusted.

In case it is desired that the camera C should be used as the one which the iris value is set in advance, the view finder attachment F is to be mounted on the camera body C. In the camera body C photoelectric elements as shown in FIG. 1 are provided and by means of the built-in electric shutter circuit as shown in FIG. 6 the photographing is carried out with a camera in which the iris value is set in advance as follows. The exposure adjusting dial 69 on the camera body C is set on "A" (automatic) and the preset iris ring 122 on the lens O on the desired iris value. By switching over of the dial 69 the switch 102 is switched over to the A contact whereby the photoconductive element AP2 is selected. The light beam coming in through the lens O reaches the photoconductive element AP2 whereby the resistance value corresponding to the brightness of the object is produced. Thus, in the output circuit of the transistor 106 of the amplifier circuit in direct connection an output corresponding to the light quantity reaching the photoconductive element AP2 is produced. Between the collector of the transistor 106 and the base of the transistor 103 of the amplifier circuit there is provided a feed back route so that the variation of the resistance value corresponding to the light quantity reaching the photoconductive element appears at the output in the reduced form. Further, in the circuit of transistors 118 to 121 composing the amplifier circuit in the direct connection similar to the above variable resistances 122 and 123 are provided, to which the film sensitivity and the iris value are set. Also between the collector of the transistor 121 and the base of the transistor 118 of this amplifier circuit there is provided a feed back route the film sensitivity and the iris value set by the variable resistance appear at the output of the amplifier circuit in a reduced form. The outputs of these two circuits are combined with the transistors 107 and 108 composing the differential amplifier circuit in such a manner that a voltage is produced in the load resistances 111, 112, 129 and 130 connected to their collector and memorized in the memory condensor 131 when the switching-over switch 132 is connected to $a_1$, $a_2$ (memory side).

Further, in order to compensate the characteristics of the above two circuits and the gamma of the photoconductive element as well as the variable resistances for setting information the variable resistances 129 and 130 are connected in parallel with the load resistances 111 and 112, by adjusting of which resistances the characteristics of both circuits are matched with each other. Further, to the above two circuits the indication circuit of shutter speed consisting of the transistors 113, 114 and 115, 116 is connected in such a manner that the shutter speed can be shown in advance from the scale of the ampere meter 117.

In connection with the pushing down of the release by means of the button the switching-over switch 132 is switched from $a_1$, $a_2$ over to $b_1$, $b_2$. By doing this, the voltage memorized in the condenser before the operation of the shutter is given to the amplifier circuit in direct connection having a reproduction circuit, in the output of which circuit a voltage having a reducing characteristics appears. By means of this control voltage the gain of the reproduction circuit is controlled whereby the enlargement effect can be obtained. Hereby in these circuits voltage stabilizing circuits are provided. In this way the memory voltage given to the base of the transistor 141 of the reproduction is enlarged and given to the output transistor in such a manner that the output resistance value is changed. The change of this output resistance value becomes equivalent to the change of the resistance change due to the light reaching the photoconductive element, the reducing effect of the memory circuit being compensated by the enlarging effect of the reproduction circuit. With the time constant decided by this output resistance value and the capacity of the time constant circuit deciding the shutter speed the control circuit of the shutter speed is operated and the proper exposure value is obtained. Namely, when in connection with the operation of the shutter the switch 149 is opened the condenser 148 is charged in accordance with the output resistance value of the above-mentioned reproduction circuit, whereby its terminal voltage is given to the base of the one transistor 146 of the differential amplifier circuit. On the other hand, to the base of the transistor 158 a stabilized voltage is given from the transistor 136 of the amplifier circuit in direct connection, whereby the difference voltage is taken out as output from the transistor 154. Hereby the influence due to the deviation of the capacity of the condenser 148 can be compensated by means of the adjusting resistance. With this voltage the switching circuit consisting of the transistor 163, 164 is operated and after the delay time determined by the time constant of the time constant circuit the transistor becomes inconductive in such a manner that the holding of the shutter closing members held by the magnet is solved and the shutter is closed.

In the present device a switching-over means to switch over the electric eye operation to the manual operation to choose the desired shutter speed is provided, whereby in order to select the shutter speed manually the switches 150 and 161 are switched from A' over to M' respectively. By doing this the time constant circuit is composed of the condenser 152 and the variable resistance 151 for shutter speed setting. Further, the standard voltage of the differential amplifier is compensated by the variable amplifier of the voltage dividing resistance. It is also possible to operate the photoconductive elements AP2 as the shutter circuit for the constant shutter speed when the fixed resistance 15 is connected to the circuit by switching the switching-over switch from the terminal A to the terminal M. Thus, the electric shutter circuit in the camera body C is set to the exposure time in accordance with the brightness of the object, the iris value set in advance of the lens O being taken into consideration. As mentioned above with the camera according to the present invention in which the iris value is set in advance, by attaching the view finder mechanism F on the camera body C the camera works as the one in which the iris value is set in advance while by dismounting the view finder mechanism F from the camera body C and mounting the iris control device A on the camera body C the camera works as the one in which the exposure time is set in advance so that with this camera a good picture of any object can always be obtained.

What is claimed is:

1. A camera system comprising:
   a camera body having a connecting portion;
   an interchangeable photographing lens mounted on the camera body;
   a first finder optical system provided in the camera body and having a connecting portion on which at least part of the finder optical system is mounted on and dismounted from the connecting portion on the camera body;
   first light receiving means incorporated in the camera body to receive light which has passed through a part of the first finder optical system;
   a diaphragm value setting means for setting the diaphragm value;
   a shutter time control means connected to the diaphragm value setting means and selectively connected to the first light receiving means to control the shutter time; and
   a diaphragm control device attachable to the connecting portion of said camera body, said diaphragm control device comprising:
   a second finder optical system connectable to the first finder optical system,
   a second light receiving means provided in the light path of the second finder optical system, and
   a shutter time setting means for setting a shutter time value,
   said diaphragm control device controlling the diaphragm value according to the outputs of the shutter time setting means and the second light receiving means;
   whereby when the diaphragm value is set by the diaphragm value setting means, the shutter time is automatically controlled, and when the shutter time value is set by the shutter time setting means the diaphragm value is automatically controlled.

2. A camera system comprising:
   a camera body having a connecting portion;
   an interchangeable photographing lens mounted on the camera body;
   a first finder optical system provided in the camera body and having a connecting portion on which at least part of the finder optical system is mounted on and dismounted from the camera body connecting portion;
   a first light receiving means incorporated in the camera body to receive light which has passed through a part of the first finder optical system;
   a diaphragm value setting means for setting the diaphragm value;
   a shutter time control means having an automatic control mechanism which controls the shutter time on the basis of outputs from the first light receiving means and the diaphragm value setting means, and a manual control mechanism which controls the shutter time according to a preset shutter time;
   selecting means connected to the shutter time control means to select the automatic control mechanism or the manual control mechanism, and having a shutter time setting portion to set a shutter time on the shutter time control means when the manual control mechanism is selected;
   a diaphragm control device mountable on the connecting portion of the camera body, said device comprising;
   a second finder optical system optically connectable to the first finder optical system,
   a second light receiving means arranged in a light path of the second finder optical system,
   a shutter time setting means which sets a shutter time value and selects the control mechanism of the shutter time control means in association with the selecting means,
   a diaphragm control means which controls the diaphragm value responsive to the outputs of the shutter time setting means and the second light receiving means, and
   a connecting means for setting the diaphragm setting means on the basis of output of the diaphragm control means.

3. A camera system according to claim 1 in which the selecting means has a shutter adjusting dial and a switch to be mounted outside the camera body, said dial having a manual time adjusting zone and an automatic time adjusting zone, wherein, in the manual zone, the manual control mechanism is selected and in the automatic zone, the automatic control mechanism is selected through the switch.

4. A camera system according to claim 2 in which said selecting means has an automatic adjusting zone and a manual time adjusting zone, the shutter time setting means having a shutter adjusting dial to be mounted outside the camera body, said dial having an automatic time adjusting zone corresponding to the automatic adjusting zone and the manual time adjusting zone of the selecting means, said adjusting zone of the shutter time setting means operating in association with the adjusting zone of the selecting means.

5. A camera system comprising:
a camera body having:
   an optical system having a first light receiving means for receiving light from an object to be photographed,
   a diaphragm information setting means which sets a diaphragm aperture value,
   a shutter time regulating means which regulates a shutter time responsive to the outputs of the first light receiving means and the diaphragm information setting means, and wherein
said camera body having a connecting portion to be connected at least to part of the optical system;
a diaphragm control device comprising:
   a first finder optical system having a connecting portion connectable to the connecting portion of the camera body,
   second light receiving means provided in the first finder optical system,
   a shutter time value information setting means which sets a shutter time value,
   a regulating means which regulates a diaphragm value on the basis of the outputs of the second light receiving means and the shutter time value information setting means, and
   a connecting member which transfers a diaphragm value to the diaphragm value information setting means in response to the output of the regulating means; and
a finder device having a second finder optical system removably attachable to the connecting portion of the camera body;
whereby when the diaphragm control device is mounted on the connecting portion of the camera body, a diaphragm value is automatically determined, and when the finder device is mounted, a shutter time is automatically determined.

6. A camera system comprising:
a camera body having a shutter time control circuit having an automatic shutter time control mechanism to be actuated by a shutter time corresponding to brightness of an object to be photographed and a manual shutter time control mechanism actuated, by a preset shutter time, and a selecting means which selects the shutter time control mechanisms, and
a diaphragm control device attachable to the camera body, comprising a shutter time setting means which presets a shutter time and is associated with the selecting means, a diaphragm value regulating means which regulates a diaphragm control corresponding to a shutter time set by the shutter time setting means and the brightness of the object, and a connecting means which couples the output of the thus regulated diaphragm value regulating means to the automatic shutter time control mechanism for controlling the automatic shutter time control.

* * * * *